United States Patent
Delia et al.

(10) Patent No.: US 8,291,470 B2
(45) Date of Patent: Oct. 16, 2012

(54) CONDITIONAL SUPPLEMENTAL PASSWORD

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 12/331,497

(22) Filed: Dec. 10, 2008

(65) Prior Publication Data

US 2010/0146602 A1    Jun. 10, 2010

(51) Int. Cl.
G04F 7/04    (2006.01)
G06F 17/30    (2006.01)

(52) U.S. Cl. .................................. 726/2; 726/26; 726/28
(58) Field of Classification Search ................. 726/2, 26, 726/28
See application file for complete search history.

(56) References Cited

U.S. PATENT DOCUMENTS

| | | | |
|---|---|---|---|
| 5,091,939 A * | 2/1992 | Cole et al. ..................... 713/183 |
| 5,513,263 A * | 4/1996 | White et al. .................... 380/44 |
| 5,533,125 A * | 7/1996 | Bensimon et al. ............. 711/163 |
| 6,941,468 B2 * | 9/2005 | Johnson ......................... 726/22 |
| 6,978,385 B1 * | 12/2005 | Cheston et al. ................. 726/18 |
| 7,383,575 B2 * | 6/2008 | Cheston et al. ................. 726/16 |
| 7,886,346 B2 * | 2/2011 | Sandhu et al. .................. 726/7 |
| 2003/0046083 A1 | 3/2003 | Devinney, Jr. et al. |
| 2003/0061520 A1 * | 3/2003 | Zellers et al. ................. 713/202 |
| 2004/0181696 A1 * | 9/2004 | Walker ......................... 713/202 |
| 2005/0134115 A1 * | 6/2005 | Betts et al. ................... 307/10.1 |
| 2006/0069916 A1 * | 3/2006 | Jenisch et al. ................ 713/172 |
| 2007/0079143 A1 * | 4/2007 | Fazal et al. .................... 713/193 |
| 2007/0124807 A1 | 5/2007 | Jau |
| 2007/0250920 A1 | 10/2007 | Lindsay |

* cited by examiner

*Primary Examiner* — William Powers
(74) *Attorney, Agent, or Firm* — George R. McGuire; David B. Woycechowsky; Bond Schoeneck & King

(57) ABSTRACT

A password protected machine where a primary alternative password and a secondary alternative password are assigned, but the secondary alternative password cannot be used to gain access unless and until the primary alternative password has been deactivated. Also, a password protected machine where a user is assigned at least two alternative passwords, and where the use of one alternative password will automatically deactivate the other password. Preferably, there is a primary password and a secondary password such that: (i) the use of the primary password does not deactivate the secondary password, but (ii) the use of the secondary password does deactivate the primary password.

18 Claims, 7 Drawing Sheets

CONDITIONAL SUPPLEMENTAL PASSWORD

BACKGROUND OF THE INVENTION

1. Field of the Invention

The present invention relates to password protected machines where a predetermined kind of access (for example, access to a predetermined set of activities) is protected by password(s) (see DEFINITIONS section) protection and more particularly to computer software with alphanumeric password protection.

2. Description of the Related Art

Password protected machines are conventional. Password protected machines where a user may or must use multiple passwords are conventional. Password protected machines using "alternative passwords" (see DEFINITIONS section) are less common, but they are known. The following discussion of related art will discuss some conventional password protected machines with multiple, non-alternative passwords, and also some conventional password protected machines with alternative passwords, because some understanding of both of these general categories of password protected machines may be helpful in understanding all aspects of the present invention. For example, US patent application 2003/0046083 ("Devinney") discloses the use of spoken passwords as a security measure for use in transaction systems, such as point of sales systems, home authorization systems, systems for establishing a telephone call and the like. More specifically, software based speech recognition techniques are applied to the spoken password to determine the identity of the speaker. Devinney further discloses a two-tier system that is conditional on rejection of a first password. A first speech password is obtained. The Devinney speech recognition unit then determines whether it recognizes the first password. If the first password is recognized, then authorization and identification will occur. If the speech recognition unit does not recognize the first password, it generates a second password. The second password is randomly generated by the Devinney speech recognition unit. The second speech password is obtained from the user, and if the second password is recognized, then authorization or identification occurs. If the second password is not recognized, no authorization or identification occurs. The two passwords of the Devinney system would not be considered as alternative passwords (see DEFINITIONS section) because the password to be used at any given point in time is not chosen by a user. It is noted that the Devinney system requires the use of speech level audio information and therefore: (i) requires the hardware and software to support this functionality; and (ii) is subject to vagaries and issues inherent in speech communication (for example, laryngitis). Also, Devinney does not deactivate the first password if it is not recognized. Nor does Devinney deactivate the first password upon successful use of the second password.

US patent application 2007/0124807 ("Jau") discloses a password exchange method in a computer system used for semiconductor fabrication and having a client server architecture. Jau discloses that the server responds to requests received from a client when a client password received therefrom matches a current password stored in the password update system. In the Jau system, a first password and a second password are received and stored by the server. When the server utilizes the first password as the current password, the client also utilizes the first password as the client password. In the Jau system, when the first password expires, the server automatically utilizes of the second password as the current password. In the Jau system, when a request from the client fails elicit a response, the client retransmits the request utilizing the second password as the client password. Jau discloses that communication failures may thereby be avoided due to password expiration and updating. The two passwords of Jau cannot be considered as alternative passwords (see DEFINITIONS section) because the second password is not available when the first password is. It is noted that Jau only uses the second password upon expiration of the first password, and does not otherwise resort to using its second password. Also, The only disclosed reason that Jau activates its second password is because of expiration of the first password.

US patent application 2007/0250920 ("Lindsay") teaches a password protected machine where a first set of activities is permitted by a first password and a second set of authorized activities is permitted by a second password. The two passwords of the Lindsay password protected machine cannot be considered as alternative passwords (see DEFINITIONS section).

US patent application 2007/0079143 ("Fazal") discloses a password protected machine with two alternative passwords (see DEFINITIONS section). Fazal discloses a password protected machine that enables a user who forgets one of his two passwords to securely recover the forgotten password. In Fazal, after a user logs in using one of her two passwords, the Fazal password system reveals the other, alternative password to the user. The passwords are stored in a persistent table in both hashed and encrypted forms, but not in their original forms. In Fazal, two, alternative passwords are activated at the same time. However, Fazal does not disclose a system where the use of one of the alternative password causes the deactivation of the other alternative password.

In some conventional password protected machines, upon certain specified conditions (for example, a forgotten password), a first password may be reset to a second, default password. Typically, in these password systems, the users is promptly required to reset the default password again to a non-default value. However, this default value password is typically not assigned until after the first password has been forgotten and deactivated. In other words, the default password is not assigned until after deactivation of the first password. Also, the default password is not typically chosen by the user, but rather automatically generated by the password protected machine. Of course, the first password and the default password are not alternative passwords because the default password only comes into play after the first password is deactivated.

In some conventional password protected machines, two "passwords" are required to be entered one after the other to get the predetermined kind of access (for example, access to a set of activities). For present purposes, this should not be considered as alternative passwords (see DEFINITIONS section) or even as separate passwords, but rather as a single multi-part password.

In some conventional password protected machines, a user is assigned multiple passwords where the multiple passwords respectively control different accounts held by the same user, or different types or levels of access obtainable by the same user. These are not alternative passwords because they do not give substantially identical access, with different passwords giving substantially different types or levels of access.

In some conventional password protected machines used by credit unions, there are primary and secondary passwords used to access the same account. However, these are not alternative passwords (see DEFINITIONS section) because the primary password can be used only on registered hardware (for example, registered client terminals), while the secondary password can be used only on non-registered hardware. This means that the primary and secondary passwords are not alternatives because they cannot be used on the same hardware, even though they might enable similar levels of access to an access controlled module (see DEFINITIONS section).

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

According to one aspect of the present invention, a primary alternative password and a secondary alternative password are assigned, but the secondary alternative password cannot be used to gain access unless and until the primary alternative password has been deactivated. In some preferred embodiments under this aspect of the present invention, the primary password may be deactivated by the user. For example, the user's use of the secondary alternative password may work to deactivate the primary alternative password so that the secondary alternative password can then be used to gain access. In other preferred embodiments under this aspect of the present invention, the primary password must be deactivated by someone or something other than the user before the pre-assigned secondary alternative password may be used to gain access. For example, a system administrator may deactivate the primary password, or it may automatically be deactivated by the control logic of the password protected machine for a variety of reasons (automatic deactivation due to passage of time, automatic deactivation due to passage of time, accidental deactivation, automatic deactivation due to a perceived, attempted security breach). According to this aspect of the present invention, the secondary alternative password is considered to be assigned, but in inactive status, while the primary alternative password is still activated. Preferably under this aspect of the present invention, the secondary password is made active only temporarily. For example, the secondary password may be active only until the primary alternative password is reset or changed. As a further example, the secondary alternative password may be allowed to be active only for one, or a limited number, of sessions, or a limited time interval. In some preferred embodiments under this aspect of the present invention, a change to the primary alternative password will also require a change to the secondary alternative password.

Another aspect of the present invention is directed to a password protected machine where a user (see DEFINITIONS section) is assigned at least two alternative passwords, and where the use of one alternative password will automatically deactivate the other password. Preferably, there is a primary password and a secondary password such that: (i) the use of the primary password does not deactivate the secondary password, but (ii) the use of the secondary password does deactivate the primary password. Preferably, the passwords are alphanumeric passwords. Preferably the conditions upon which the secondary password is designed to be used include: (i) a user forgetting the primary password; and/or (ii) compromise of the primary password. Preferably, the secondary password will also continue to work in situations where the primary password is deactivated, such as: (i) certain types of revocation of the primary password; (ii) certain types of suspensions of the primary password; (iii) inactivation due to communication failure; (iv) inactivation due to infrastructure failure; and/or (v) too many invalid login attempts using the primary password. In some preferred embodiments use of the secondary alternative password will cause it to start acting as a primary alternative password, effectively replacing the deactivated primary password, while a new secondary alternative password is assigned to replace the old secondary alternative password.

In some preferred embodiments of the present invention, the system administrator will be notified when: (i) the secondary alternative password is used; and/or (ii) the secondary alternative password becomes active. Preferably, the system administrator can deactivate both the primary alternative password and the secondary alternative password in order to handle situations where it is desired to completely discontinue the user's access.

Various embodiments of the present invention may exhibit one or more of the following objects, features and/or advantages:

(i) reduces lost time, delay and associated costs that would otherwise result from inability to access due to problems with the primary password;

(ii) restore or repair authentication problems with the account;

(iii) boosts employee productivity;

(iv) better empowers user to retain access, especially while primary password issues are being addressed;

(v) reduces burden on a user to remember a primary password; and/or (vi) makes it more feasible for user to forego creating tangible documentation of a primary password, relying instead on memory; and/or (vii) improves password security for the reason stated above in item (vi) in this list.

One aspect of the present invention is a method of password protecting access control. The method includes the following steps: (a) assigning a primary password to a user, with the primary password, when activated, being usable to gain access comprising access to at least a first access controlled module; (b) subsequent to and/or contemporaneous with step (a), activating the primary password; (c) prior to, subsequent to and/or contemporaneous with step (a), assigning to the user a secondary password, with the secondary password, when activated, being usable to gain access comprising access to at least the first access controlled module; (d) subsequent to and/or contemporaneous with step (c), deactivating the secondary password; (e) subsequent to steps (a), (b), (c) and (d), performing pre-expiration deactivation of the primary password; and (f) subsequent to and/or contemporaneous with step (e), activating the secondary password.

A further aspect of the present invention is a password protected machine including a user input module, an access controlled module, a password database, a password control module, and an access control module. The user input module is structured and/or programmed to allow entry of passwords by a user. The access controlled module is structured and/or programmed to be accessed by the user only upon receipt of an assigned and activated password from the user. The password database is structured and/or programmed to store multiple passwords associated with the user and respective activation status of the multiple passwords. The password control module is structured and/or programmed to: (i) assign and store a primary password for the user in the password database, (ii) assign and store a secondary password for the user in the password database, (iii) on an ongoing basis, set the activation status of the primary password, and (iv) on an ongoing basis, set the activation status of the secondary password. The access control module is structured and/or programmed to control the password control module to activate the secondary password in response to pre-expiration deactivation of the primary password.

Another aspect of the present invention is a machine readable medium for use with a password protected machine that includes a user input module structured and/or programmed to allow entry of passwords by a user, an access controlled module structured and/or programmed to be accessed by the user only upon receipt of an assigned and activated password from the user, and a password database structured and/or programmed to store multiple passwords associated with the user and respective activation status of the passwords. The machine readable medium is programmed with a password control software and an access control software. The password control software is programmed to: (i) assign and store a primary password for the user in the password database, (ii) assign and store a secondary password for the user in the password database, (iii) on an ongoing basis, set the activation status of the primary password, and (iv) on an ongoing basis, set the activation status of the secondary password. The access control software is programmed to control the password control module to activate the secondary password in response to pre-expiration deactivation of the primary password.

Another aspect of the present invention is a method of password protecting access control, the method including the following steps: (a) assigning a primary alternative password to a user, with the primary password, when activated, being usable to gain access comprising access to at least a first access controlled module; (b) prior to, subsequent to and/or contemporaneous with step (a), assigning to the user a secondary alternative password, with the secondary alternative password, when activated, being usable to gain access comprising access to at least the first access controlled module; (c) subsequent to and/or contemporaneous with steps (a) and (b), receiving an entered password from the user; (d) subsequent to step (c), determining that the entered password sufficiently matches the secondary alternative password; and (e) subsequent to step (d), deactivating the primary alternative password in response to a determination that the secondary alternative password has been received at step (d).

Another aspect of the present invention is a password protected machine including a user input module, an access controlled module, a password database, a password control module and an access control module. The user input module is structured and/or programmed to allow entry of passwords by a user. The access controlled module is structured and/or programmed to be accessed by the user only upon receipt of an assigned and activated password from the user. The password database is structured and/or programmed to store a plurality of passwords associated with the user and respective activation status of the plurality of passwords. The password control module is structured and/or programmed to: (i) assign and store a primary alternative password for the user in the password database, (ii) assign and store a secondary alternative password for the user in the password database, (iii) on an ongoing basis, set the activation status of the primary alternative password, and (iv) on an ongoing basis, set the activation status of the secondary alternative password. The access control module is structured and/or programmed to: (i) allow a user to access the access controlled module when the primary alternative password is received through the user input module and has activated status; (ii) allow a user to access the access controlled module when the secondary alternative password is received through the user input module and has activated status; and (iii) deactivate the primary password when the secondary alternative password is received through the user input module and has activated status.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
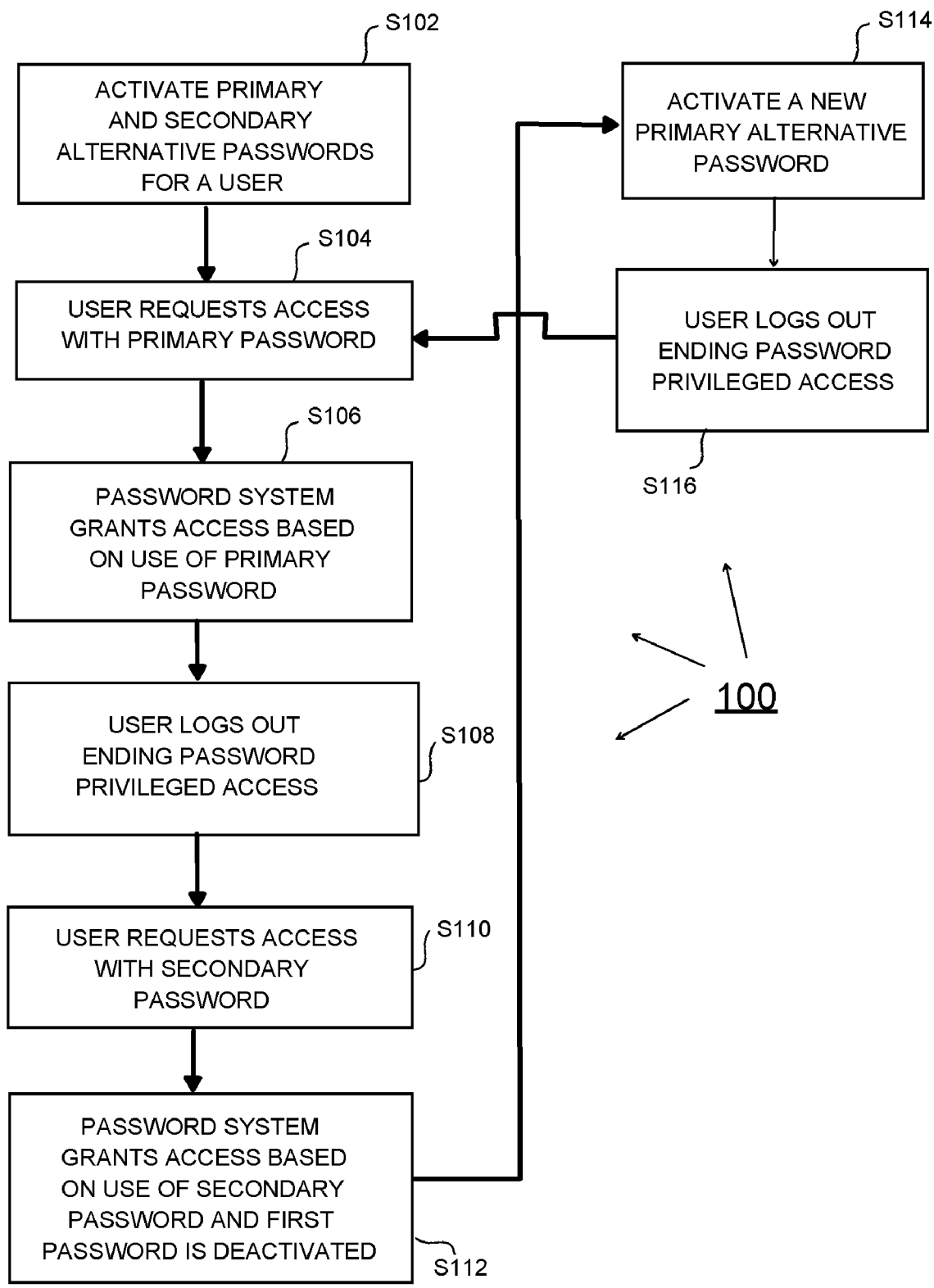
FIG. 1 is a flowchart showing a first password protected access method according to the present invention.

FIG. 1 shows a flowchart of password protected access method 100 including the following steps: S102; S104; S106; S108; S110; S112; S114; and S116. At step S102, primary and secondary alternative passwords are activated. For example, a system administrator might choose the secondary alternative password and a user, who is to use the passwords, might choose the primary alternative password. The primary password might be different from the primary password in certain respects. For example, the primary password may require a different number of alphanumeric characters or might have different requirements regarding inclusion of numerals than does the primary password. As a further example, the primary password might be alphanumeric, while the secondary password might take other password forms now known or to be developed in the future, such as speech recognition type, fingerprint, retinal scan or graphical. In most preferred embodiments, however, both the primary and secondary passwords are alphanumeric and entered by the user through a keyboard or touchscreen or the like. In some (not necessarily preferred) embodiments, additional alternative passwords may be granted to the user.

At step S104, the user requests access using the primary password. At step S106, the password protected system will grant password protected access, so long as the primary password is still activated and has been correctly entered by the user. As is known in the art, the user may be given a limited number of attempts to enter the password correctly. There may be additional preconditions to access. For example, it may be required that the user is attempting access through predetermined, approved equipment (for example, a pre-approved client computer). The amount and nature of the access may depend upon the identity of the user. For example, a given user's password may be correlated to only certain, possible types of access, but not others. As a further example, the amount of access time could depend upon the identity of the user. However, it is important to keep in mind that the primary alternative password will give some type of access. In preferred embodiments, it is the primary password that the user will generally be expected to use, because use of the secondary alternative password will de-activate the first alternative password in preferred embodiments of the present invention.

At step S108, the user logs out, or is automatically logged out, thereby ending its password protected access. At a later time, step S110 occurs, wherein the user requests access with the secondary alternative password, instead of the primary alternative password. There are many reasons why the user may resort to the secondary, alternative password, including, but not necessarily limited to the following: (i) a user forgetting the primary password; (ii) compromise of the primary password; (iii) certain types of revocation of the primary password; (iv) certain types of suspensions of the primary password; (v) inactivation due to communication failure; (vi) inactivation due to infrastructure failure; and/or (vii) too many invalid login attempts using the primary password.

At step S112, the password system both grants access based on the entry of the secondary alternative password and deactivates the primary alternative password. These two portions of step S112 may be done in either order or at the same time. There may be embodiments of the present invention where the primary password is not deactivated (see DEFINITIONS section), but it is a highly preferred feature and allows some important advantages over systems, like Fazal, where the primary alternative password is not deactivated upon use of the secondary alternative password. Fazal enables a recovery and revelation of the primary alternative password of an account to a user when the secondary alternative is used by the user. On the other hand, preferred embodiments of the present invention deactivate the primary alternative password upon a use of the secondary alternative password. This is preferred because it addresses situations where the primary password (for example, a primary password for a shared account) has potentially been compromised. Furthermore, in some preferred embodiments of the present invention, the primary password is deactivated to the extent that it is permanently disabled by use of the secondary alternative password. This can lead to other advantages. For example, if a user has written down the primary alternative password and then lost the writing, then embodiments of the present invention that permanently disable the primary alternative password would render that writing useless after the secondary password is used, without relying on the user to affirmatively cancel and not reinstate the lost, primary alternative password.

In many preferred embodiments of the present invention, the type(s) and amount(s) of access that is granted by the secondary alternative password is exactly coextensive with the type(s) and amount(s) of access that is granted by the primary alternative password, but this is not necessarily required. For example, the secondary password may provide less access than the primary alternative password under the theory that access should be restricted until any possible security compromise or communication breakdown should be addressed, and a new primary alternative password is issued. However, the access granted by the primary alternative password and the secondary alternative password must have substantial overlap, or else they would not be "alternative passwords" as that term is defined herein. (See DEFINITIONS section.)

At step S114, a new primary alternative password is activated for future use. This is not necessarily required in all embodiments of the present invention, or in all circumstances even in embodiment where this step is sometimes performed. Generally speaking, the idea is that the user resolves any issues that lead to the use of the secondary alternative password in the first place, and that the user needs a new primary alternative password for repeated access on an ongoing basis. Also, if the secondary password is used because the old primary alternative password was lost or otherwise potentially compromised, then the issuance of the new primary alternative password would resolve those issues because it is different than the old primary alternative password.

At step S116, the user logs out of the access that was obtained through use of the secondary alternative password at step S110. Processing may then proceed back to step S104, wherein regular access can be requested and achieved with the new primary alternative password.

Figure 2:
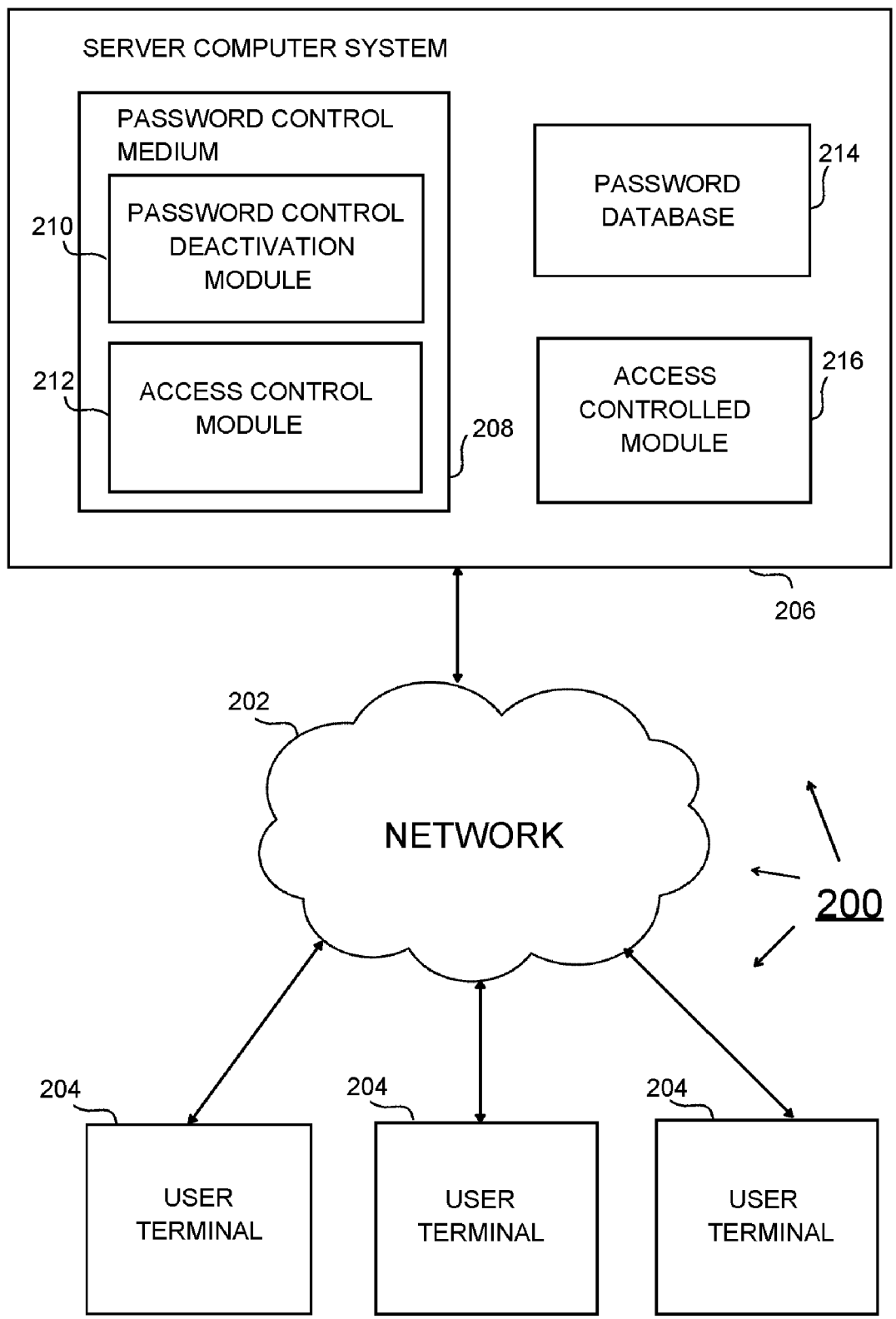
FIG. 2 is a block diagram of a first embodiment of a password protected machine (see DEFINITIONS section) according to the present invention.

FIG. 2 shows password protected machine 200, including: network 202; user terminals 204 and server computer system 206. The server computer system includes password control medium 208; password database 214; and access controlled software module 216. The password control medium includes: password control deactivation module 210; and access control module 212. In this embodiment, the users are located remotely from the portion of the machine they may wish to access, but are connected to the machine through network (for example, the Internet, a WAN, a LAN). The user terminals 204 each include a keyboard (not separately shown) so that alphanumeric passwords can be entered. In some preferred embodiments, the user terminals take the form of general purpose personal computers.

The server computer system may take the form of a single computer, or it may take the form of multiple computer(s) and/or other components. In other embodiments, the password control related software an/or the access controlled module may not be in, or otherwise include, a computer as such. For example, the password control logic and access controlled module could be in the form of a machine tool, with the controlled access module being the operative machine tool hardware. As a further example, the password control logic and access controlled module could be incorporated into a telephone system, where the logic is built or programmed into the telephone switches and the access controlled module is made up of telephone lines. In other words, many types of password protected machines may incorporate the present invention.

Password control medium 208 is a machine readable medium and may take the form of data on a storage device(s) or in computer memory(ies) of any type now known or to be develop in the future. The password database 214 may be included on the password control medium although it is not so included in machine 200. Access control module 212 receives a password entered by a user and authorizes access by the user of access controlled module 216 if the user has entered an appropriate primary alternative password or secondary alternative password. Password control deactivation module deactivates (see DEFINITIONS section) the primary alternative password whenever a user's secondary alternative password is used by the access control module. Password database 214 is used to store and keep track of all the activated primary alternative passwords and activated secondary alternative passwords for all the users on an ongoing basis.

Figure 3:
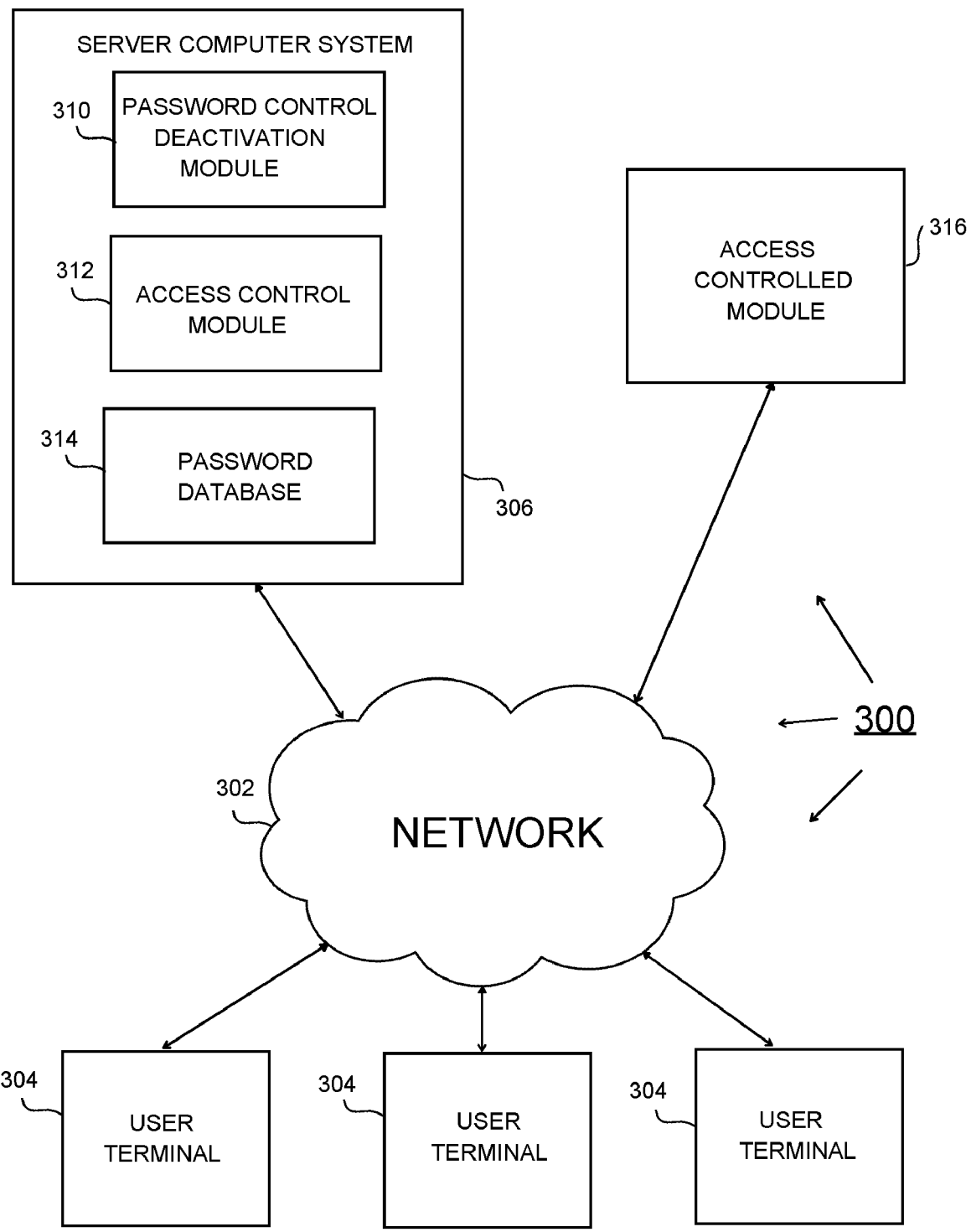
FIG. 3 is a block diagram of a second embodiment of a password protected machine according to the present invention.

FIG. 3 shows password protected machine 300, including: network 302; user terminals 304; server computer system 306; and access controlled module 316. The server computer system includes password database 314; password control deactivation module 310; and access control module 312. The machine 300 embodiment of the present invention makes it clear that the access controlled module is not necessarily something in the same component as the password control logic, and it may not even be anything with in a computer at all.

Figure 5A:
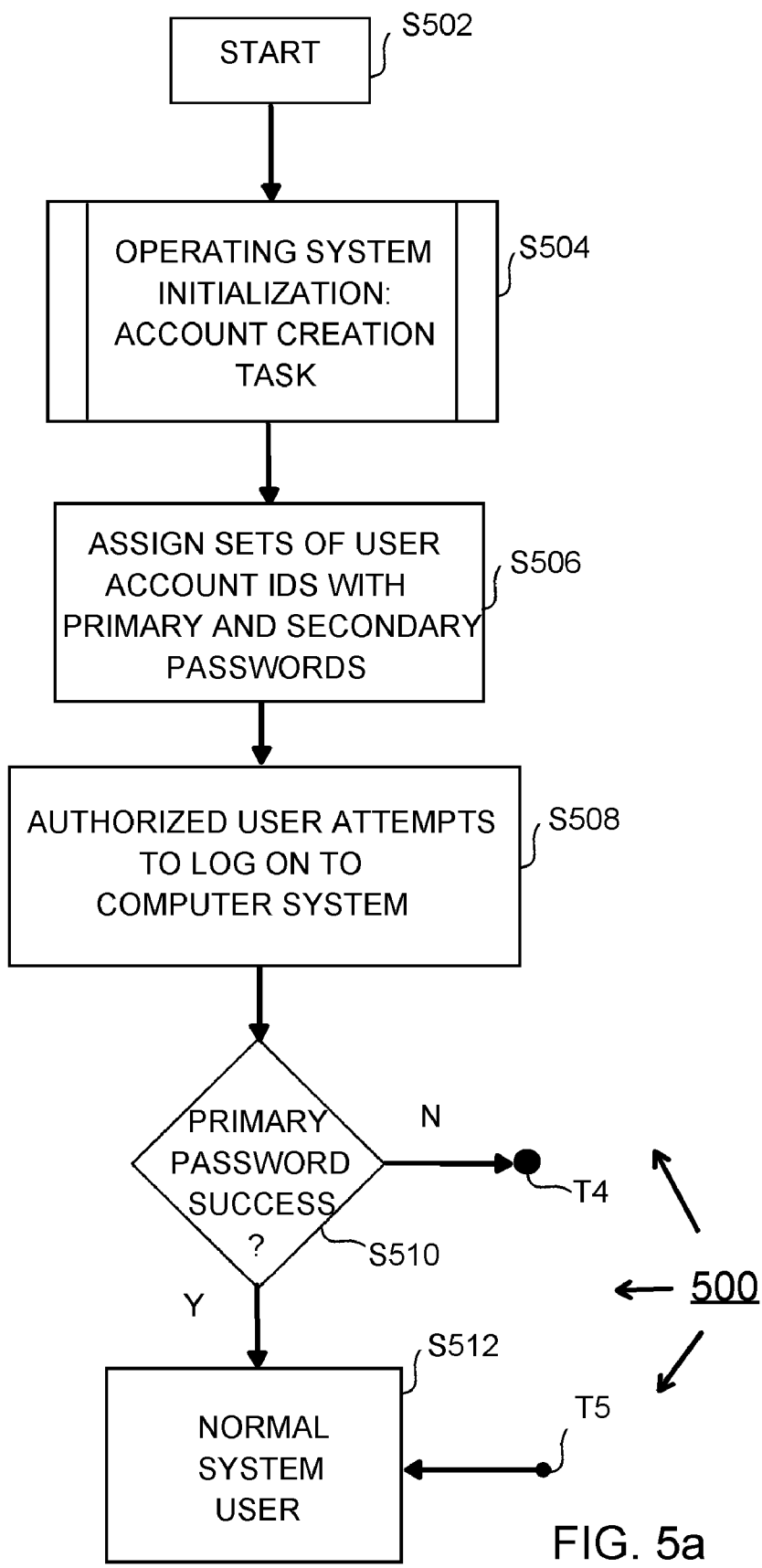
FIGS. 5a and 5b are a flowchart showing a second password protected access method according to the present invention.
Figure 5B:
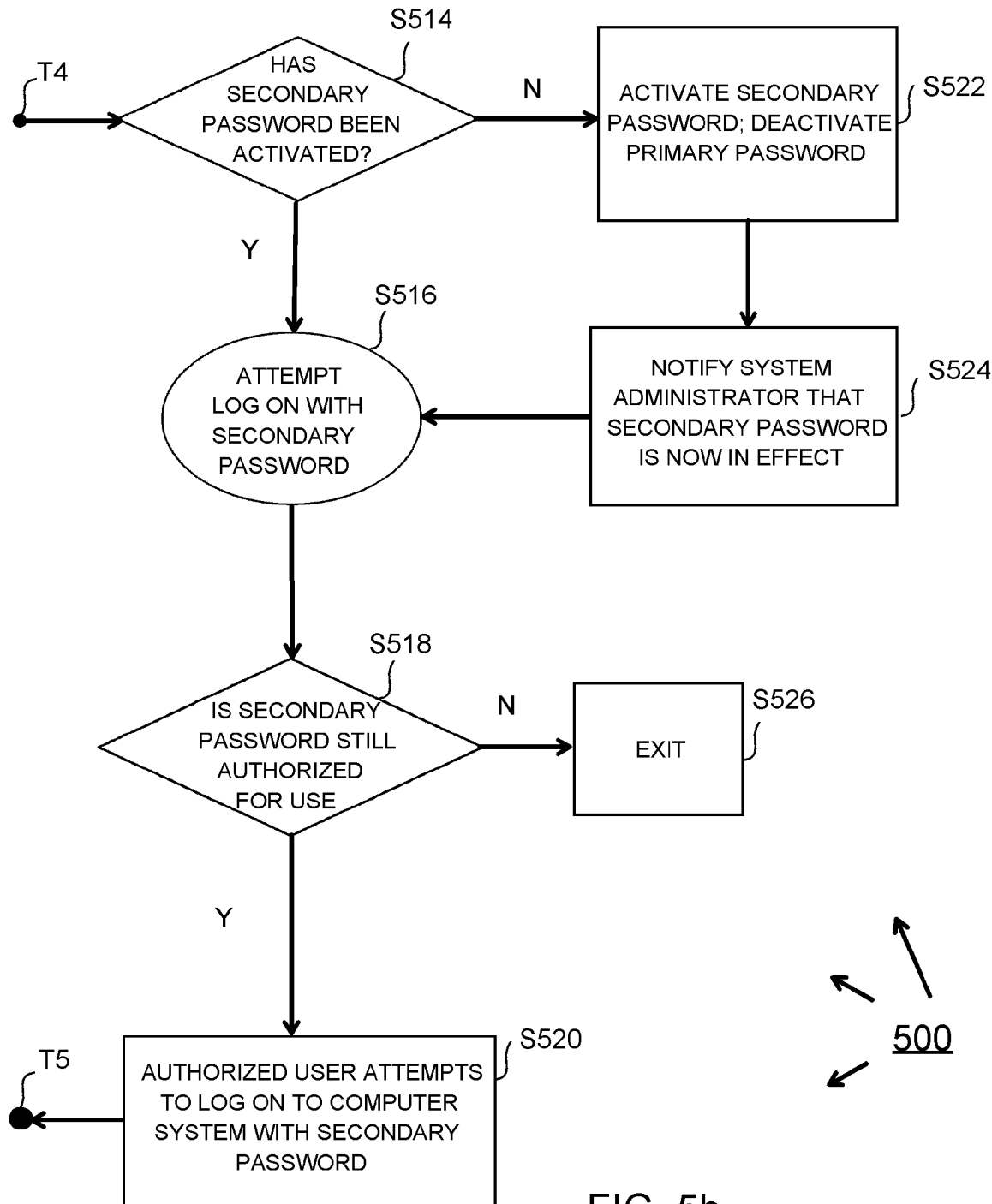

As shown in FIGS. 5a and 5b, method 500 includes the following steps: S502; S504; S506; S508; S510; S512; S514; S516; S518; S520; S522; S524; and S526. Process flow between and among these steps proceeds as shown in FIGS. 5a and 5b. Method 500 expands single password authentication methods into a method using a secondary alternative password according to the present invention. At step S510, the password protection logic decides whether the user has successfully logged using the primary alternative password. If the user has successfully logged on, processing proceeds to allow the user its password protected access at step S512.

At step S514, a decision is made as to whether the secondary password has yet been activated. If it has, the processing proceeds to step S516. If it has not, then processing proceeds to step S522 and S524.

At step S516, the user attempts to sign on with the secondary password. If the attempt is successful, processing proceeds to steps S518 and then S520. If not, processing proceeds to steps S518 and then S526.

Figure 4A:
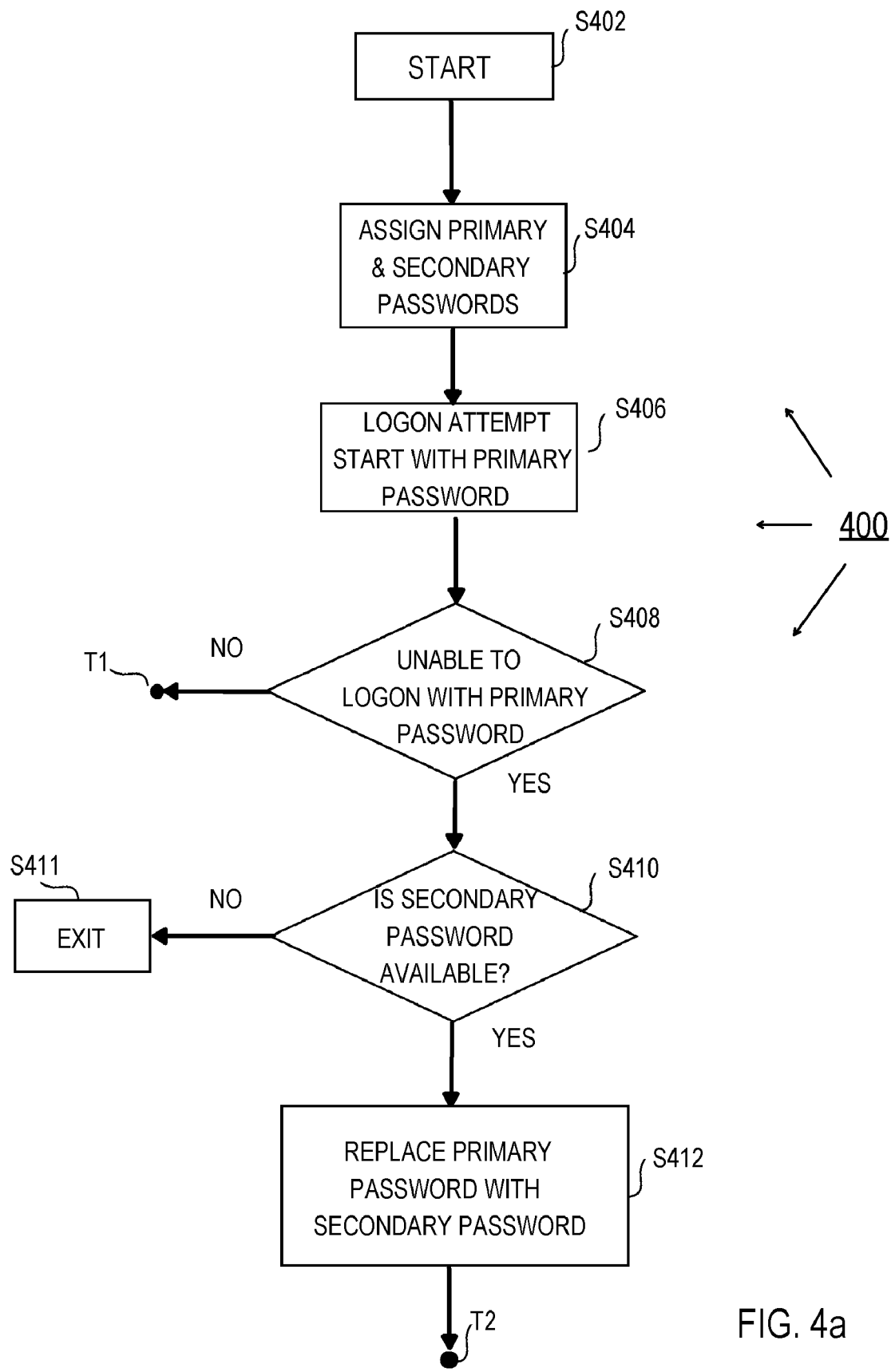
FIGS. 4a and 4b are a flowchart showing a second password protected access method according to the present invention.
Figure 4B:
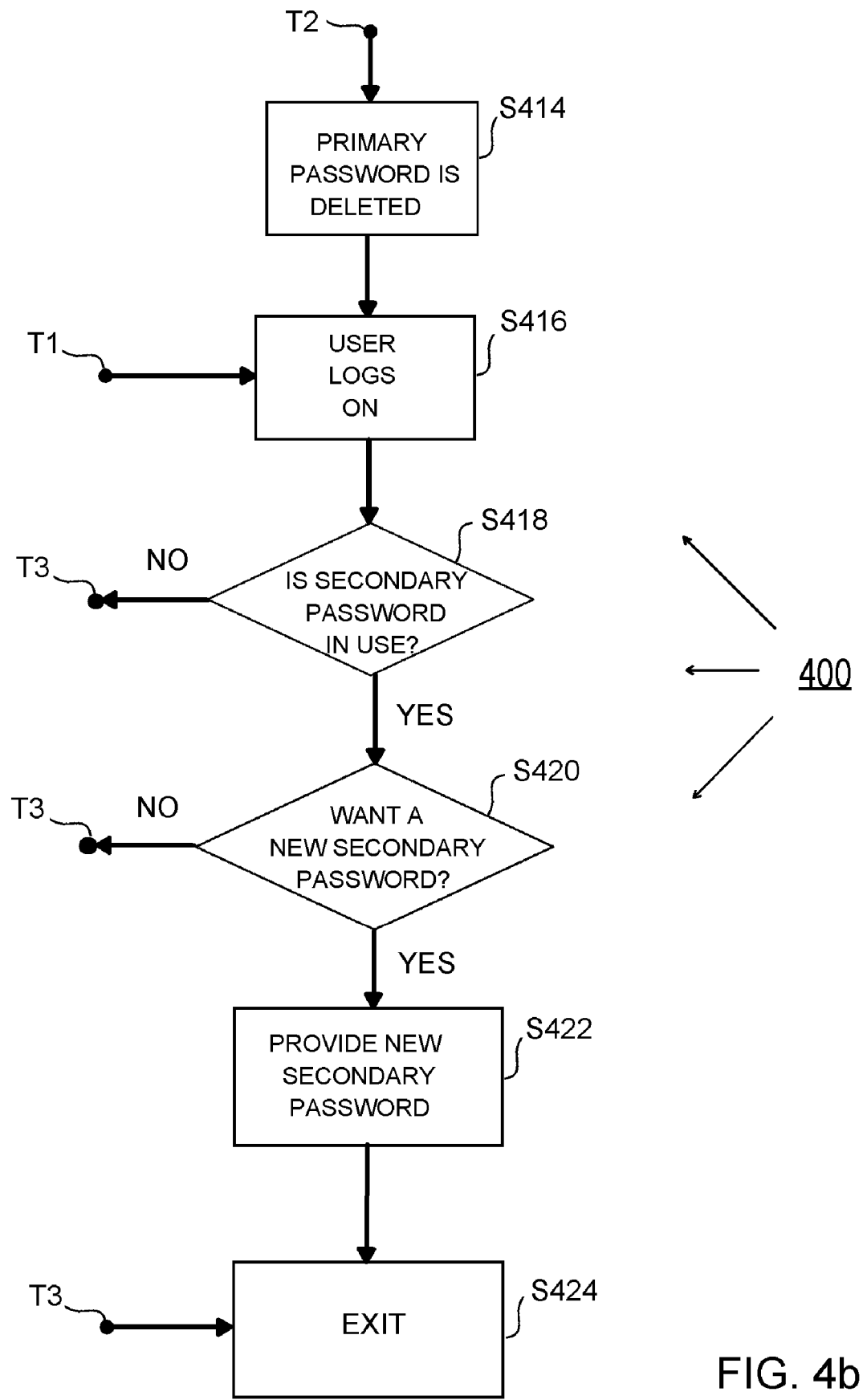

As shown in FIGS. 4a and 4b, method 400 includes the following steps: S402; S404; S406; S408; S410; S411; S412; S414; S416; S418; S420; S422; and S424. Process flow proceeds as shown on FIGS. 4a and 4b.

At step S406 a user starts an attempt to obtain its password protected access. Processing then proceeds to step S408.

At step S408, either the password protected machine or the user indicates an inability to logon using the primary password. This can happen in a number of different ways: (i) user affirmatively indicates that it cannot use the primary password; (ii) user implicitly indicates that it cannot use the primary password by attempting to use the secondary password; (iii) machine affirmatively indicates to user that primary alternative password cannot be used; and/or (iv) machine implicitly indicates that primary alternative password cannot be used by refusing to accept the primary alternative password.

At steps S412 and S414 of method 400, the use of the secondary alternative password does two things: (i) deactivates the primary alternative password (this is similar to methods discussed above and is an important feature of some embodiments of the present invention); and (ii) the secondary alternative password takes on the status of the primary alternative password. According to item (ii) the old secondary alternative password becomes the new primary alternative password and the user would be expected to begin using it on a regular basis. Also, at steps S420 and S422, a new secondary alternative password is assigned, which means the old secondary password (that is, the new primary password) will be deactivated if the new secondary password is used in a subsequent session. In this way, the password status of one of the alternative passwords changes from secondary to primary.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

password: includes, but is not limited to, alphanumeric type passwords.

alternative passwords: two coexisting assigned and activated passwords, either of which can be chosen by a user to give at least substantially identical access through identical user interface hardware; in other words, either alternative password can be used by a user at the time of a given session and alternatively entered through a given input interface to get at least substantially the same access to an access controlled module (see DEFINITIONS section).

access controlled module: may include hardware or software or both and must have at least some functionality that is at least partially password protected.

machine: any subject matter that is considered to be a "machine" and/or "manufacture" within the meaning of 35 USC section 101.

user: includes, but is not limited to, group users; and non-human users.

activated/deactivated: "activated" means that the password is in a any status allows at least substantially the degree and/or amount of access as if it is fully activated; "deactivated" means that the password is in any status that allows substantially less than the degree and/or amount of access as if it is fully activated; the amount and/or degree of access allowed by an activated password may vary somewhat depending upon conditions; the amount and/or degree of access allowed by a deactivated password may be something more than absolutely no access.

Pre-expiration deactivation: deactivating a password prior to and for reasons other than its expiration due to occurrence of a pre-determined amount of time and/or usage; pre-expiration deactivations include, but are not necessarily limited to password suspensions.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A method of password protecting access control, the method comprising the following steps:
   (a) assigning a primary password to a user, with the primary password, when activated, being usable to gain access comprising access to at least a first access controlled module;
   (b) subsequent to or contemporaneous with step (a), activating the primary password;
   (c) prior to, subsequent to or contemporaneous with step (a), assigning to the user a secondary password, with the secondary password, when activated, being usable to gain access comprising access to at least the first access controlled module;
   (d) subsequent to or contemporaneous with step (c), deactivating the secondary password;
   (e) subsequent to steps (a), (b), (c) and (d), performing pre-expiration deactivation of the primary password; and
   (f) subsequent to or contemporaneous with step (e), activating the secondary password.

2. The method of claim 1 wherein the pre-expiration deactivation performed at step (e) is due to suspension of the primary password.

3. The method of claim 1 further comprising the step of:
   subsequent to step (f), deactivating the secondary password upon at least one of the following conditions: (i) predetermined number of logons using the secondary password; or (ii) passage of a predetermined amount of time since the occurrence of step (f).

4. The method of claim 1 further comprising the step of:
   subsequent to step (f), changing/resetting, by the user, of the primary password.

5. A password protected machine comprising:
   a user input module structured or programmed to allow entry of passwords by a user;
   an access controlled module structured or programmed to be accessed by the user only upon receipt of an assigned and activated password from the user; a password database structured or programmed to store a plurality of passwords associated with the user and respective activation status of the plurality of passwords;
   a password control module structured or programmed to: (i) assign and store a primary password for the user in the password database, (ii) assign and store a secondary password for the user in the password database, (iii) on an ongoing basis, set the activation status of the primary password, and (iv) on an ongoing basis, set the activation status of the secondary password; and
   an access control module structured or programmed to control the password control module to activate the secondary password directly in response to pre-expiration deactivation of the primary password without requiring the user to authenticate before using the secondary password to gain access to the access controlled module.

6. The machine of claim 5 wherein the access control module is further structured or programmed to deactivate the secondary password after a predetermined amount of time after its activation in response to deactivation of the primary password.

7. The machine of claim 5 wherein the access controlled module is further structured or programmed to deactivate the secondary password after a predetermined number of logons using the secondary password.

8. The machine of claim 5 wherein the access control module is further structured or programmed to notify a system administrator at least a first time the secondary password is used to log on subsequent to its activation in response to deactivation of the primary password.

9. A machine readable non-transitory medium for use with a password protected machine that includes a user input module structured or programmed to allow entry of passwords by a user, an access controlled module structured or programmed to be accessed by the user only upon receipt of an assigned and activated password from the user, and a password database structured or programmed to store a plurality of passwords associated with the user and respective activation status of the plurality of passwords, the machine readable medium being programmed with the following code:
   password control software programmed to: (i) assign and store a primary password for the user in the password database, (ii) assign and store a secondary password for the user in the password database, (iii) on an ongoing basis, set the activation status of the primary password, and (iv) on an ongoing basis, set the activation status of the secondary password; and
   access control software programmed to control the password control software to activate the secondary password directly in response to pre-expiration deactivation of the primary password without requiring the user to authenticate before using the secondary password to gain access to the access controlled module.

10. The medium of claim 9 wherein the access control software is further to deactivate the secondary password after a predetermined amount of time after its activation in response to deactivation of the primary password.

11. The medium of claim 9 wherein the access control software is further programmed to deactivate the secondary password after a predetermined number of logons using the secondary password.

12. A method of password protecting access control, the method comprising the following steps:
   (a) assigning a primary alternative password to a user, with the primary password, when activated, being usable to gain access comprising access to at least a first access controlled module;
   (b) prior to, subsequent to armor contemporaneous with step (a), assigning to the user a secondary alternative password, with the secondary alternative password, when activated, being usable to gain access comprising access to at least the first access controlled module;
   (c) subsequent to or contemporaneous with steps (a) and (b), receiving an entered password from the user;
   (d) subsequent to step (c), determining that the entered password sufficiently matches the secondary alternative password; and
   (e) subsequent to step (d), deactivating the primary alternative password in response to a determination that the secondary alternative password has been received at step (d).

13. The method of claim 12 further comprising the step of:
   (f) subsequent to step (d), allowing the user to gain access to the first access controlled module in response to a determination that the secondary alternative password has been received at step (d).

14. The method of claim 12 further comprising the step of:
   (f) subsequent to step (d), reassigning the secondary alternative password to be the primary alternative password in response to a determination that the secondary alternative password has been received at step (d).

15. A password protected machine comprising:
a user input module structured or programmed to allow entry of passwords by a user;
an access controlled module structured or programmed to be accessed by the user only upon receipt of an assigned and activated password from the user; a password database structured or programmed to store a plurality of passwords associated with the user and respective activation status of the plurality of passwords;
a password control module structured or programmed to: (i) assign and store a primary alternative password for the user in the password database, (ii) assign and store a secondary alternative password for the user in the password database, (iii) on an ongoing basis, set the activation status of the primary alternative password, and (iv) on an ongoing basis, set the activation status of the secondary alternative password; and
an access control module structured or programmed to: (i) allow a user to access the access controlled module when the primary alternative password is received through the user input module and has activated status; (ii) allow a user to access the access controlled module when the secondary alternative password is received through the user input module and has activated status; and (iii) deactivate the primary password when the secondary alternative password is received through the user input module and has activated status.

16. The machine of claim 15 wherein:
the primary alternative password is alphanumeric; and
the secondary alternative password is alphanumeric.

17. The machine of claim 15 further comprising a communication network structured, connected or programmed to allow communication of passwords from the user input module to the access control module.

18. The machine of claim 15 wherein the access control module is further structured or programmed to control the password control module to reassign the secondary alternative password to be the primary alternative password in the password database in response to a determination that the secondary alternative password has been received through the user input module.

* * * * *